DATA TRANSMITTER FOR TELEPHONE SYSTEMS

Filed July 24, 1961 8 Sheets-Sheet 1

INVENTORS
ABRAHAM BROTHMAN,
RICHARD D.REISER,
STEPHEN J.HALPERN,
BRUCE A.CUDDEBACK

BY

OSTROLENK, FABER, GERB & SOFFEN
ATTORNEYS

DATA TRANSMITTER FOR TELEPHONE SYSTEMS

Filed July 24, 1961 8 Sheets-Sheet 2

INVENTORS
ABRAHAM BROTHMAN,
RICHARD D. REISER,
STEPHEN J. HALPERN,
BRUCE A. CUDDEBACK
BY
OSTROLENK, FABER, GERB & SOFFEN
ATTORNEYS

DATA TRANSMITTER FOR TELEPHONE SYSTEMS

Filed July 24, 1961 8 Sheets-Sheet 3

INVENTORS
ABRAHAM BROTHMAN,
RICHARD D. REISER,
STEPHEN J. HALPERN
BRUCE A. CUDDEBACK
BY

OSTROLENK, FABER, GERB & SOFFEN
ATTORNEYS

INVENTORS
ABRAHAM BROTHMAN,
RICHARD D. REISER,
STEPHEN J. HALPERN,
BRUCE A. CUDDEBACK

BY *Ostrolenk, Faber, Gerb & Soffen*

ATTORNEYS

Nov. 23, 1965 A. BROTHMAN ET AL 3,219,758

DATA TRANSMITTER FOR TELEPHONE SYSTEMS

Filed July 24, 1961 8 Sheets-Sheet 5

INVENTORS
ABRAHAM BROTHMAN,
RICHARD D. REISER,
STEPHEN J. HALPERN,
BRUCE A. CUDDEBACK.

BY Ostrolenk, Faber, Gerb & Soffen
ATTORNEYS

INVENTORS
ABRAHAM BROTHMAN
RICHARD D. REISER
BY STEPHEN J. HALPERN
BRUCE A. CUDDEBACK.
Ostrolenk, Faber, Gerb & Soffen
ATTORNEYS.

DATA TRANSMITTER FOR TELEPHONE SYSTEMS

INVENTORS
ABRAHAM BROTHMAN,
RICHARD D. REISER,
STEPHEN J. HALPERN,
BRUCE A. CUDDEBACK.

BY Ostrolenk, Faber, Gerb & Soffen
ATTORNEYS.

INVENTORS
ABRAHAM BROTHMAN
RICHARD D. REISER,
STEPHEN J. HALPERN,
BRUCE A. CUDDEBACK.

BY

Ostrolenk, Faber, Gerb & Soffen
ATTORNEYS

United States Patent Office 3,219,758

Patented Nov. 23, 1965

3,219,758

DATA TRANSMITTER FOR TELEPHONE SYSTEMS

Abraham Brothman, Dumont, N.J., Richard D. Reiser, Newark, N.Y., and Stephen J. Halpern, Forest Hills, and Bruce A. Cuddeback, Newark, N.J., assignors, by mesne assignments, to Transitel International Corp., Paramus, N.J., a corporation of New Jersey Filed July 24, 1961, Ser. No. 126,278
12 Claims. (Cl. 179—2)

Our invention relates to data transmitters and more particularly to data transmitters which are designed to transmit, data received from parallel sources, in a serial fashion.

Data transmitting systems, which are presently in widespread use, normally consist of electronic communications equipment at positions remote from one another which are able to transmit to a remote location in response to a transmission request from that remote location. Transmission systems of this type find widespread use in a variety of applications such as, for example, branch offices to central office inventory systems, branch offices to central office bookkeeping systems; train, plane and hotel reservation systems, and automated meter reading systems, to name just a few. In arrangements of this type, one location designated as the central office or central exchange is set up to gather data from the remote locations in the data transmission network and to perform its activties in response to the data gathered. For example, in inventory systems, the central location, in response to the data which it has gathered, makes decisions regarding what remote locations require replenishing of their inventories and which warehouse is best suited to replenish the inventory of the remote location having the depleted inventory. As another example, in the meter reading system the central office in response to the received meter readings compiles and prepares bills for the subscribers within the network.

The data transmitters utilized in such a network at the remote locations must be able to transmit data to the central location at a reasonably rapid rate and must initiate transmission automatically upon a transmission request imposed upon it by the central office. Networks of the general type set forth above are normally quite extensive in size and for this reason require reliable transmission equipment which is capable of transmitting data accurately and which may operate reliably for long periods of time.

In systems having a large number of locations within the network, transmission between the central location and the remote locations is performed on a time-sharing basis. It is desirable therefore to affect transmission in short periods of time so that a larger number of remote locations may communicate with the central location per unit of time. For this reason, it is desirable that the transmitters at the remote locations become energized by the local energy source only upon the receipt of a transmission request signal while at the same time having the facility for "locking-in" upon the transmission medium to momentarily energize the transmitter upon receipt of the transmit request in order that the transmitter may lock-in on the energized state. One embodiment employed herein is so designed as to recognize a transmit request on a wire transmission medium such as the standard telephone wires. In present day telephone systems the ringing facility is energized by either a sinusoidal or square wave type form of a specified frequency. The line monitoring circuitry is so arranged as to recognize the transmit request signal which is a step pulse having a specified amplitude and pulse duration so as not to confuse this signal with other signals normally applied to the communication link. The line monitoring circuit is further arranged to accomplish the recognition of the transmit request signal without loading the line. This leads to the requirement of transmission equipment which operates at reasonably high speeds. In high speed operating systems of this type, it becomes necessary to synchronize the receiving equipment at the central location with the transmitting equipment at the remote location which is presently in communication with the central location.

Many such systems presently in use employ synchronous motors at both the remote and central locations so as to synchronize the transmitter at the remote location with the receiving equipment at the central location. Synchronous systems of this type are very difficult to maintain since voltage and frequency variations in local supply sources may have considerably large effects upon the system. Also, it is quite difficult to produce synchronous motors which are identical twins, that is, which operate in exact synchronism with each other. The manufacture of such high quality systems becomes an extremely expensive undertaking.

The transmitter device of our invention operates at reasonably high speeds without the need for such synchronous motors or any other type of local synchronous methods (such as crystal controlled or non-drifting oscillators or a multiple of the A.C. power frequency) by producing its own synchronizing information.

Our novel data transmitter is comprised of a motor driven rotating arm which is adapted to engage a plurality of electrical contacts through one complete circular sweep of the arm. Alternate ones of said contacts accept data normally in the form of binary coded signals from an input device such as a meter, a computer or a tape punch to name only a few. One typical input device from which the data transmitter may receive binary coded information is a shaft angle encoder of the type set forth in U.S. application No. 125,247 entitled, "Code Stack Assembly," filed July 19, 1961, now Patent No. 3,165,733 by A. Brothman and assigned to the assignee of the instant invention. Shaft angle encoders of this type convert the angular position of a rotatable shaft into binary coded data. The rotatable shafts may be the shafts to which dial pointers of a meter may be attached such as the dial pointers in a water, gas or electric meter of the types widely in use today. In shaft angle encoders of the type set forth in the above identified application, the binary information is available in parallel fashion at each of its plurality of sensing brushes. The data transmitter of the instant invention converts the binary data available in parallel form into a serial pulse train which is in turn transmitted to the central location.

The remaining ones of the electrical contacts of the data transmitter are adapted to intersperse synchronizing pulses between adjacent data pulses. The synchronizing signals are then utilized by the central location receiver to synchronize the receiver with the operation of the data transmitter thereby completely avoiding the need for synchronous motors or any other synchronizing means at each location. The serialized data from the data transmitter is transmitted either directly to the receiver by means of the transmission link such as the wire conductors of a telephone or telegraph system or the data transmitter may be utilized as the input for a radio frequency transmitting means which transmits data through the atmosphere in the form of electromagnetic wave propogation.

Means are provided to energize the data transmitter only in response to a transmission request signal emanating from the central location. De-energizing means act to cut off the data transmitter in response to one complete rotation of the rotating arm. The de-energizing means may however be modified so as to permit a plurality of 360° sweeps by the rotating arm to take place. The de-energizing means also prevent the rotary arm from assuming any position other than the "O" or starting position for the subsequent sweep upon the completion of the present 360° sweep, thus avoiding the possibility of transmitting only a portion of the 360° sweep which the data transmitter traverses.

In applications wherein the data transmitter is employed to serialize encoded data received from a bank of shaft angle encoders and transmit the serialized data, switching means are provided which are incorporated into the transmitter structure for selectively energizing only one encoder at a time which permits a large saving in the number of connecting leads between the encoders and the transmitter.

The connecting circuitry in addition to reducing the leads required to a minimum, is so arranged as to prevent confusion as to the accuracy of a reading.

In order to modulate the current on a telephone line wherein two distinctive states of current magnitude are employed to represent binary information, the method presently in use consists of simply shunting the line which is done by physically engaging two contact surfaces. Since the wiper arm of the transmitter and the contact segments it serially engages may be subject to contact "bounce" (i.e., chattering contact engagement), it is important that the spurious signals which may result from this be readily distinguishable from the opposite binary state. Also, since the entire line voltage is impressed across the contact segments and wiper arm contact as then come into engagement, this voltage surge places a heavy burden upon the contacts resulting in a short transmitter operating life.

To overcome this, we have provided an electronic current modulating means which has its output connected across the telephone line. Also, the input circuit requires a substantially small control signal relative to its output thus diminishing considerably the voltage to which the transmitter contact segments and the wipe arm contact are subjected to.

In telephone networks which include party line subscribers or in any type of applications wherein a plurality of transmitters are responsive to the same transmission request signal, the receiving facility must be apprised of the termination of transmission of all of these parallel connected transmitters. Since the transmission request signal does not have a facility for "knowing" how many transmitters are connected in this parallel arrangement, the last transmitter of the group to transmit is provided with means for generating a long pulse of greater duration than the transmitter synchronizing or data pulses which is recognized by the receiving facility as an end of transmission signal enabling the receiver facility to condition the next remote transmitter. In cases where only one transmitter is employed, it can clearly be seen that such a transmitter does include a long pulse generating means.

It is therefore one object of our invention to provide a data transmitter which is so designed as to produce its own synchronizing signals concurrently with the transmission of data.

Another object of our invention is to provide a data transmitter for transmitting data from parallel sources in serial fashion which is so designated as to automatically become energized and de-energized upon the initiation of a transmission request signal and completion of the transmission of the data requested respectively.

Still another object of our invention is to provide a data transmitter for transmitting data from parallel sources in serial fashion which is so designed as to automatically align itself into the starting position in preparation for subsequent data transmission requests.

Still another object of our invention is to provide a data transmitter which transmits data from parallel sources in serial fashion which is so designed as to become energized automatically upon the recognition of a given shift in voltage magnitude for a predetermined duration regardless of the magnitude of the voltage prior to the change in that voltage.

Another object of our invention is to provide a data transmitter which transmits data received from a plurality of sources which is so arranged as to sequentially accept data from said plurality of sources on an only one-at-a-time basis.

Another object of our invention is to provide a transmitter for impressing encoded data upon a transmission line including novel electronic shunting means for modulating the encoded data upon the transmission line.

These and other objects of our invention will be apparent from the following description when taken in connection with the drawings, in which.

Figure 1:
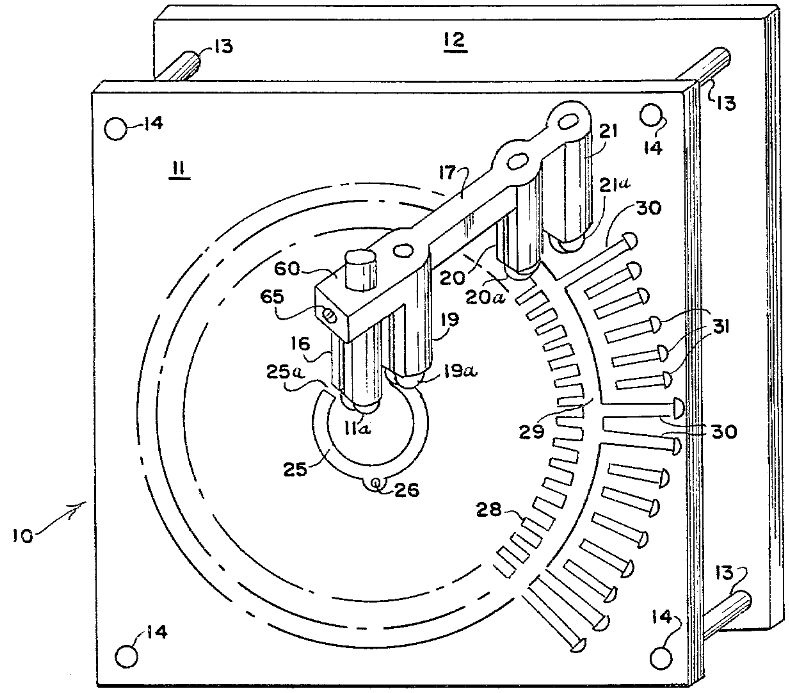
FIGURE 1 is a perspective view of a portion of my novel data transmitter.
Figure 2:
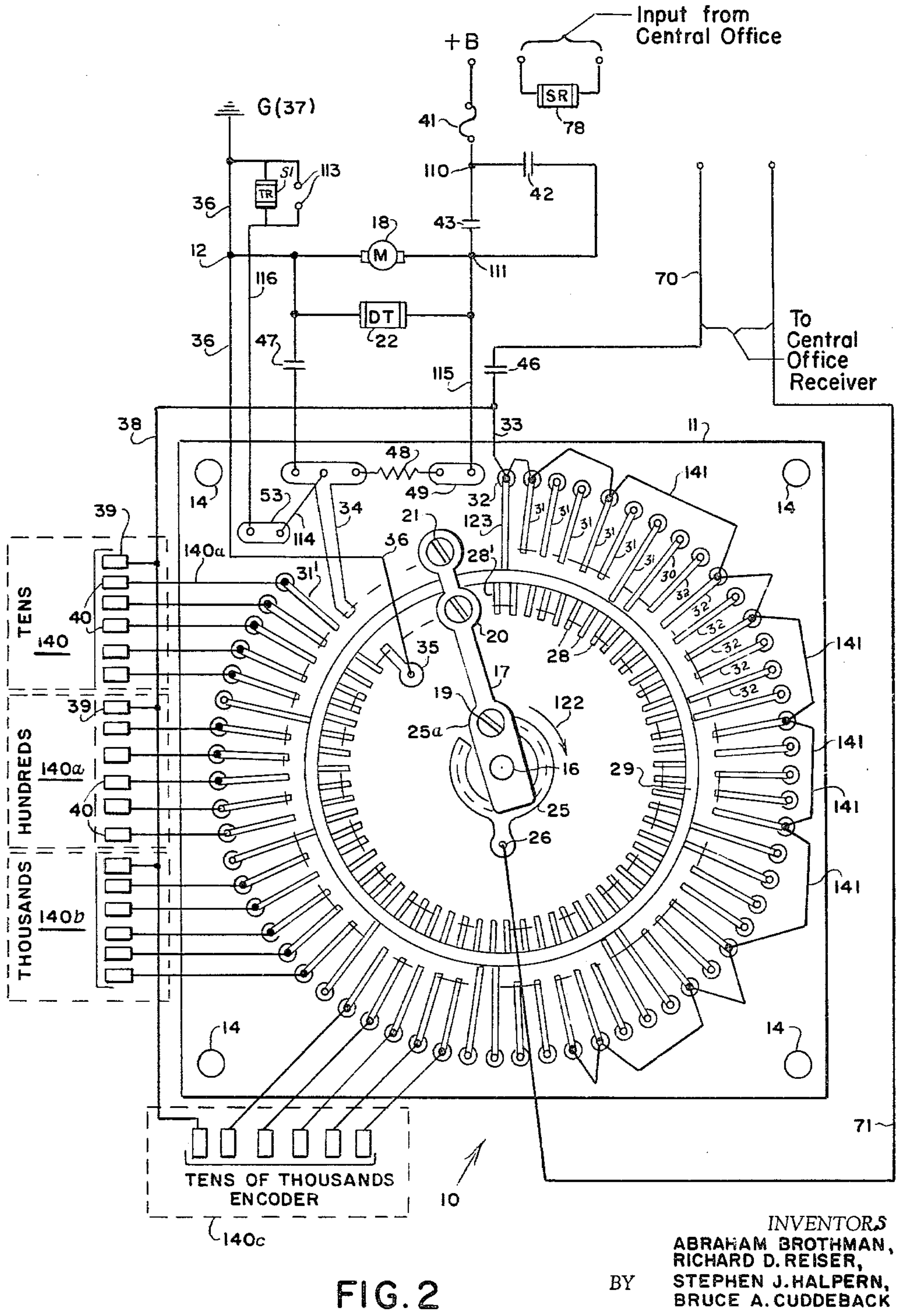
FIGURE 2 is a schematic diagram showing the electrical circuitry employed in data transmitter shown in FIGURE 1.
Figures 4A, 4B, 4C, 5A, 5B, 5C:
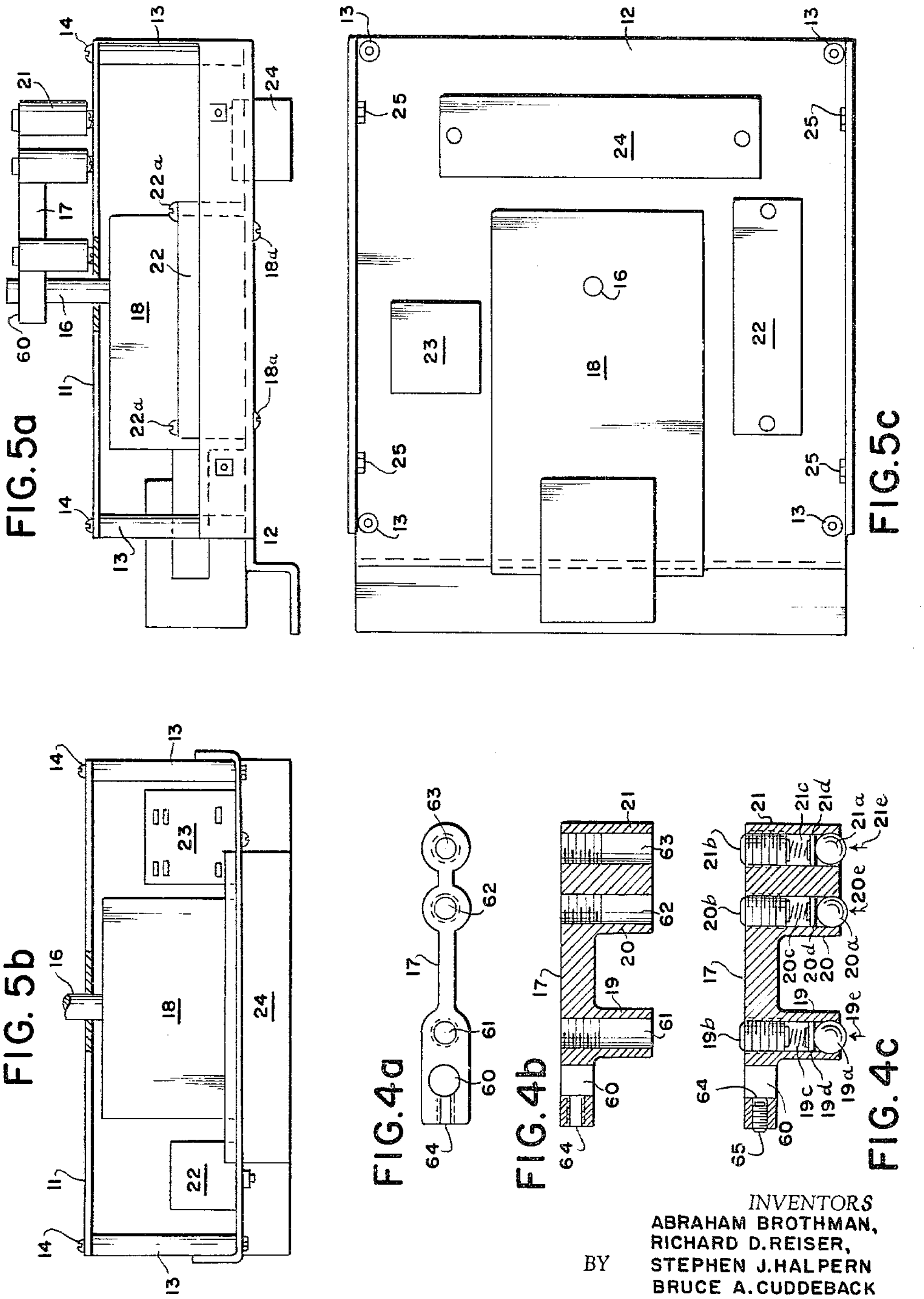

FIGURES 4*a* through 4*c* are top, side and side-assembled views respectively of the data transmitter rotating arm shown in FIGURES 1 and 2.

FIGURES 5*a* and 5*b* are side and front views respectively of the data transmitter shown in FIGURE 1.

FIGURE 5*c* is a top view of the data transmitter taken along line A—A of FIGURE 5*a*.

Figure 6:
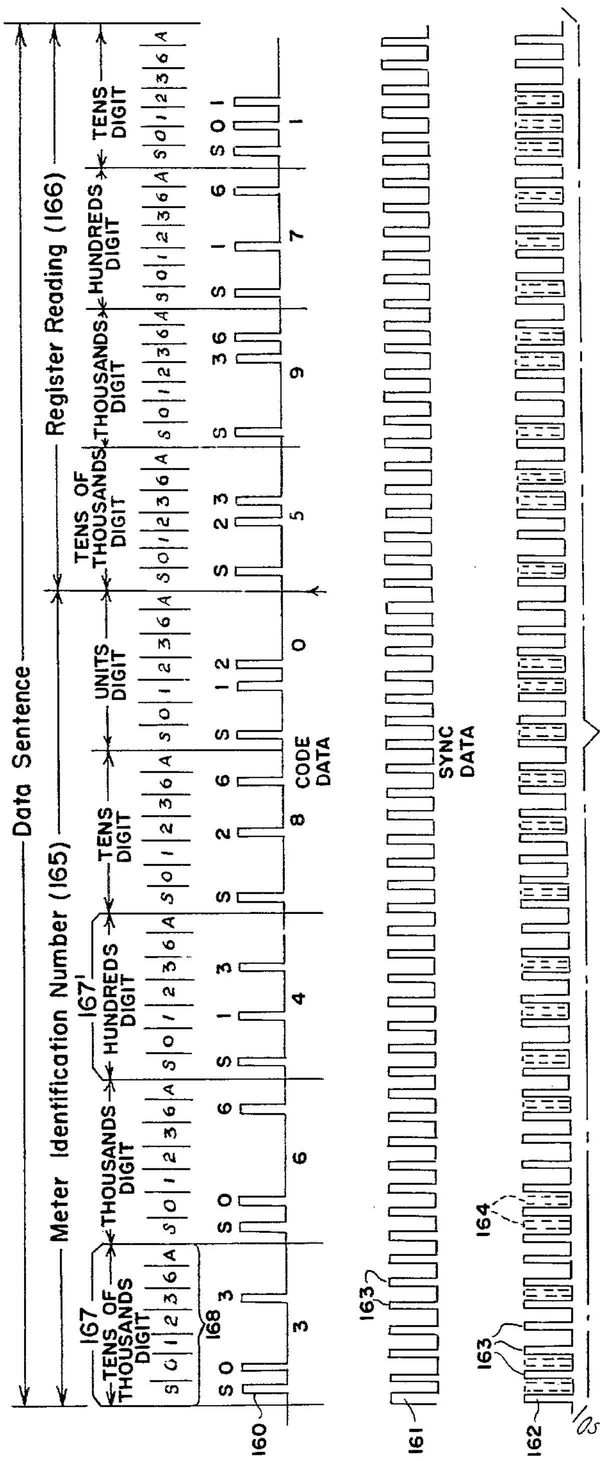

FIGURE 6 is a diagram showing typical coded signals transmitted by the transmitter of our novel invention.

Figure 7:
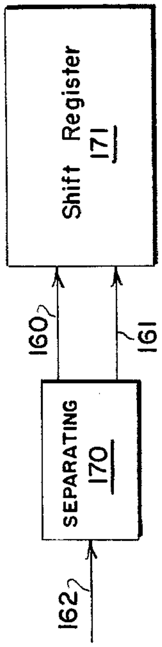

FIGURE 7 is a block diagram of a receiving means for receiving and registering the encoded signals transmitted by the transmitter of FIGURE 2.

Figures 8A, 9:
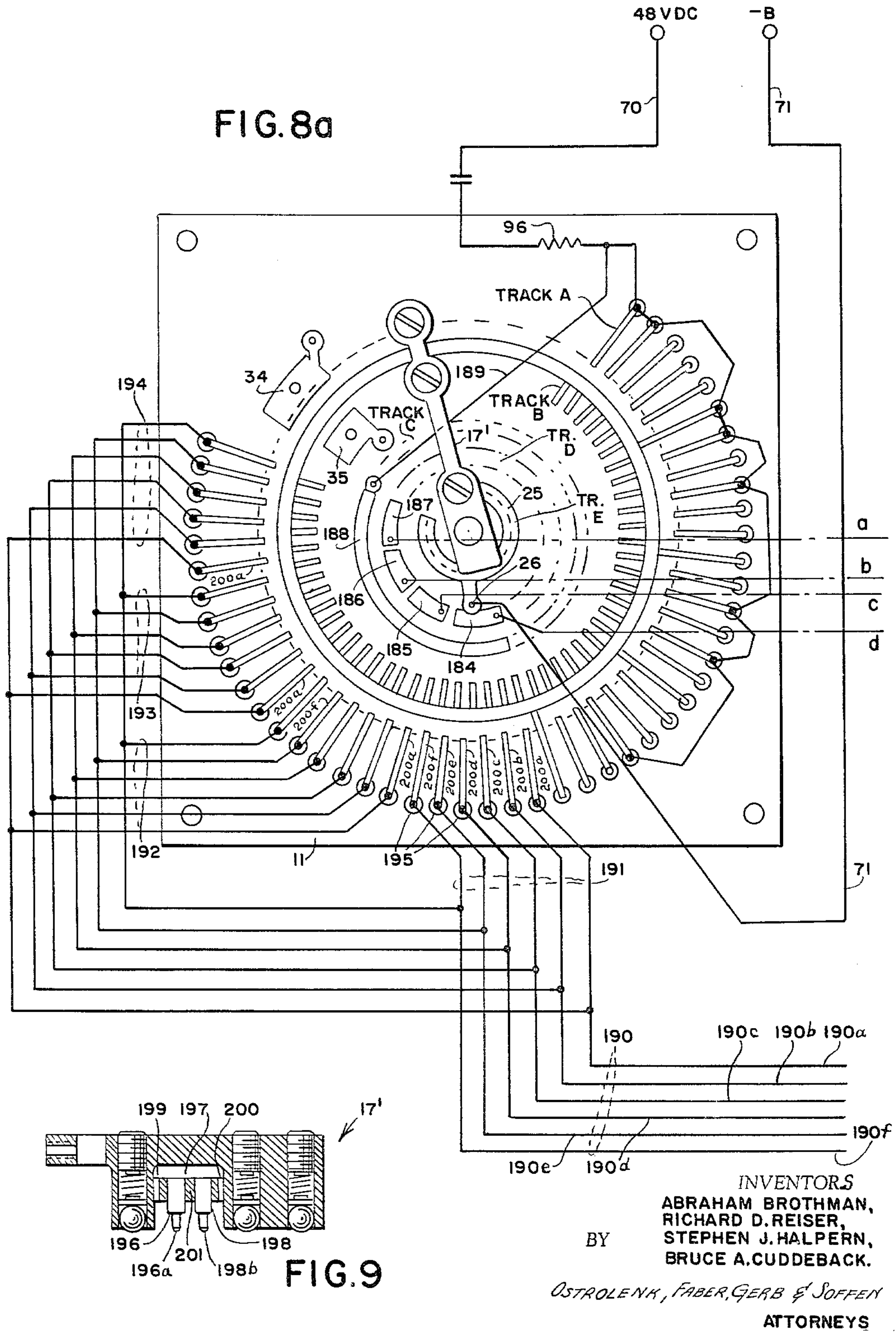
Figure 8B:
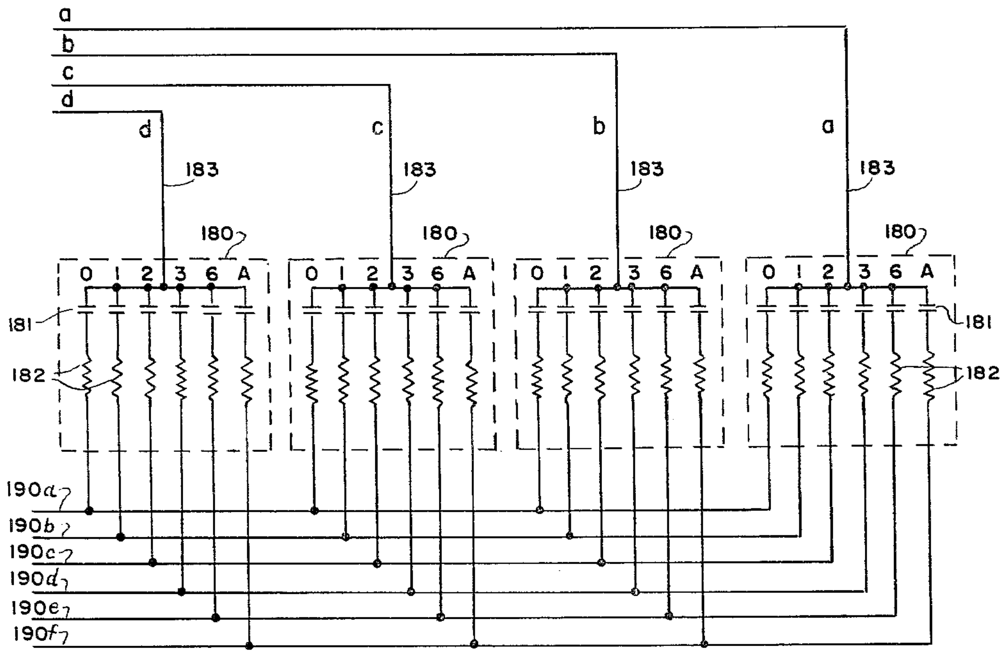

FIGURES 8*a* and 8*b* are circuit diagrams of another transmitter embodiment showing the circuitry employed to sequentially energize a plurality of binary encoders for transmission of the encoded data of only the energized encoder means.

FIGURE 9 is a cross-sectional view of a modified wiper arm utilized in the transmitter of FIGURE 8*a*.

Figure 10:
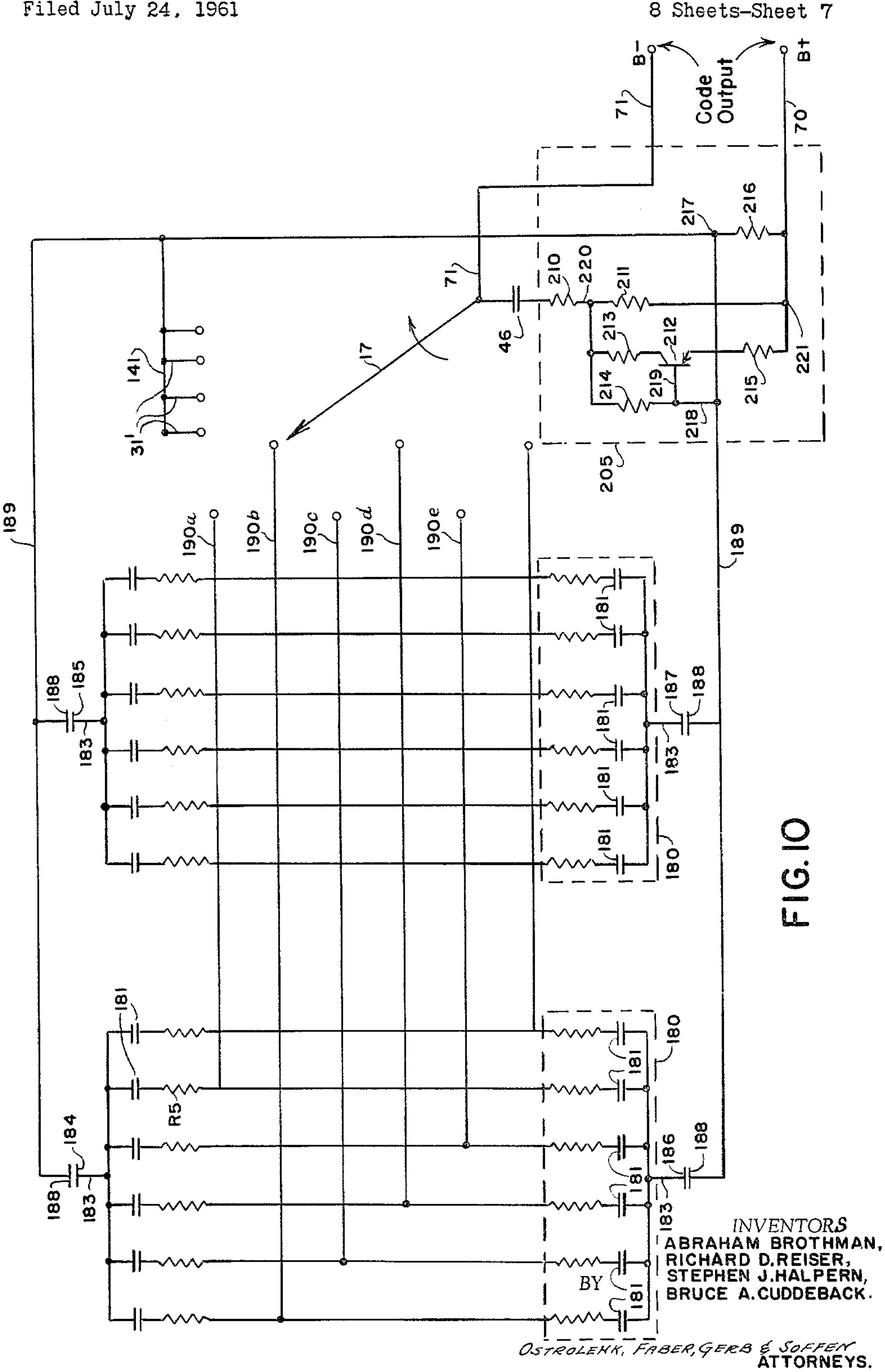

FIGURE 10 is a circuit diagram of the two state current modulator utilized to modulate a telephone subscriber line.

Figure 11A:
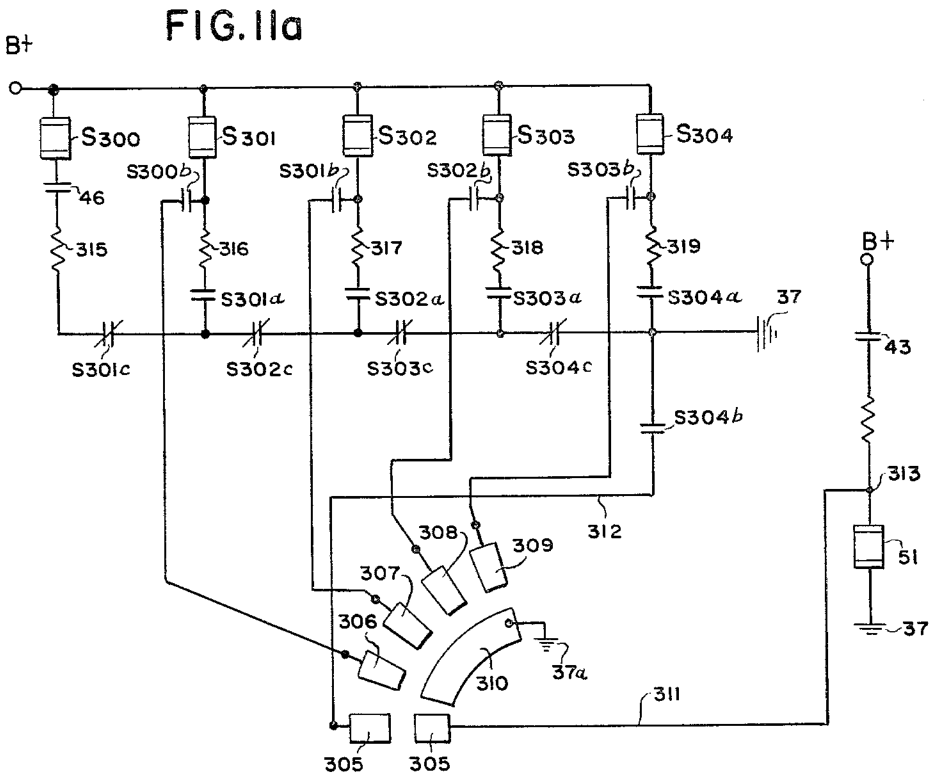
Figure 11B:
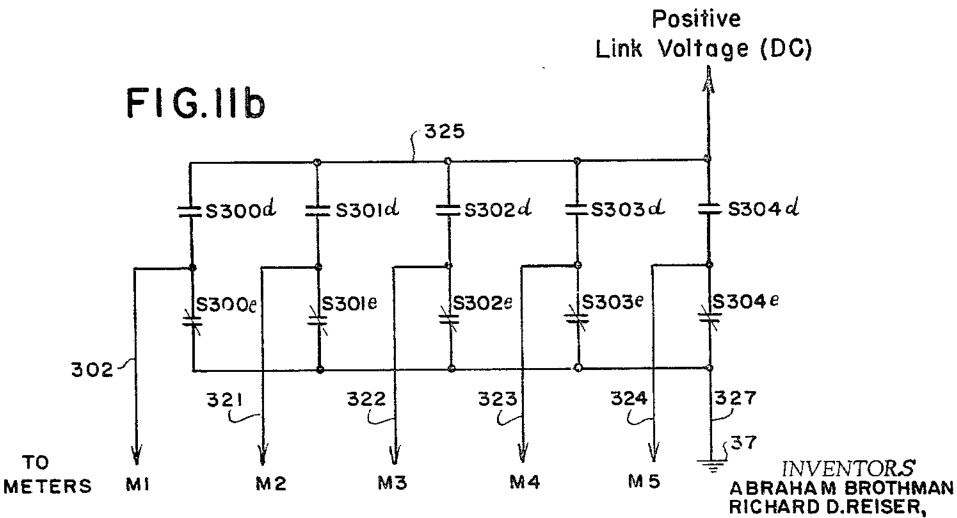

FIGURES 11*a* and 11*b* are schematic diagrams of the circuit employed with the novel transmitter for obtaining five 360° sweeps of the transmitter wiper arm.

Referring now to the drawings, in which like numerals designate like elements, FIGURES 1 and 5*a* through 5*c* show our novel data transmitter 10 which is comprised of a switching circuit board 11 (which may be a printed circuit board) which is mounted to a back plate 12 by fastening means 14. Cylindrical spacing members 13 space 11 and 12 apart a predetermined distance in order to provide adequate space for the components mounted therebetween.

Switching circuit plate 11 is provided with an aperture **11*a* through which shaft 16 is passed. Rotary arm 17 is rigidly secured to shaft 16 which is inserted through aperture 60 by means of set screw 65. Rotary arm 17 has three conductive fingers 19, 20 and 21**.

Shaft 16 rotates about its own longitudinal axis under control of motor 18 which is mounted between plates 11 and 12 by fastening means **18*a***.

Switching circuit plate 11 has a first 25 and second 29 circular conductive coating thereon. Circular ring 25 has a gap **25*a* whereas circular ring 29 is completely enclosed for reasons to be more fully described. A plurality of radially aligned conductive members 28, 30 and 31 surround conductive circle 29. Conductive members 28 and 30 are all electrically connected to circular conductive member 29. However, conductive members 31 are spaced apart and therefore insulated from conductive circle 29** for a reason to be more fully described.

Each rotary arm finger 19, 20 and 21 has a sphere **19*a*, 20*a* and 21*a* respectively operatively positioned at their lower ends. These spheres which are formed from a conductive material such as steel, for example, are positioned so as to come into electrical engagement with circular conductive member 25 and radial members 28 and 30–31** respectively in a manner to be more fully described.

Rotary arm 17 shown in FIGURES 4*a* through 4*c* is cast from a conductive member such as bronze for example and is machined so as to form apertures 60, 61, 62 and 63. Aperture 60 receives shaft 16 (see FIGURES 1 and 5*b*). Aperture 64 has its longitudinal axis perpendicular to the longitudinal axis of aperture 60. A set screw 65 which is inserted into aperture 64 bears upon shaft 16 in order to rigidly secure arm 17 to shaft 16.

Each of the apertures 61, 62 and 63 are tapped at their upper ends for receiving set screws 19*b*, 20*b* and 21*b* respectively. Positioned immediately beneath each set screw is a spring means 19*c* through 21*c* respectively. A spring retainer member 19*d* through 21*d* is positioned between spring means 19*c* through 21*c* and each conductive sphere 19*a* through 21*a*, respectively.

The upward forces 19*e* through 21*e* acting on conductive spheres 19*a* through 21*a* respectively to maintain said spheres within their respective holes 61 through 63 are provided by the plate 11 upon which the conductive spheres 19*a* through 21*a* rest. The downward forces applied to spheres 19*a* through 21*a* are provided by spring means 19*c* through 21*c* which forces are sufficient to maintain the spheres in rigid engagement with the surface of plate 11 at all times. Set screws 19*b*, 20*b* and 21*b* may be rotated to vary the contact pressure to any desired amount. The spherical conductive members 19*a* through 21*a* cooperate with the rotary arm 17 to provide the necessary electrical path for transmission of binary coded data therethrough in a manner to be more fully described.

Figure 3:
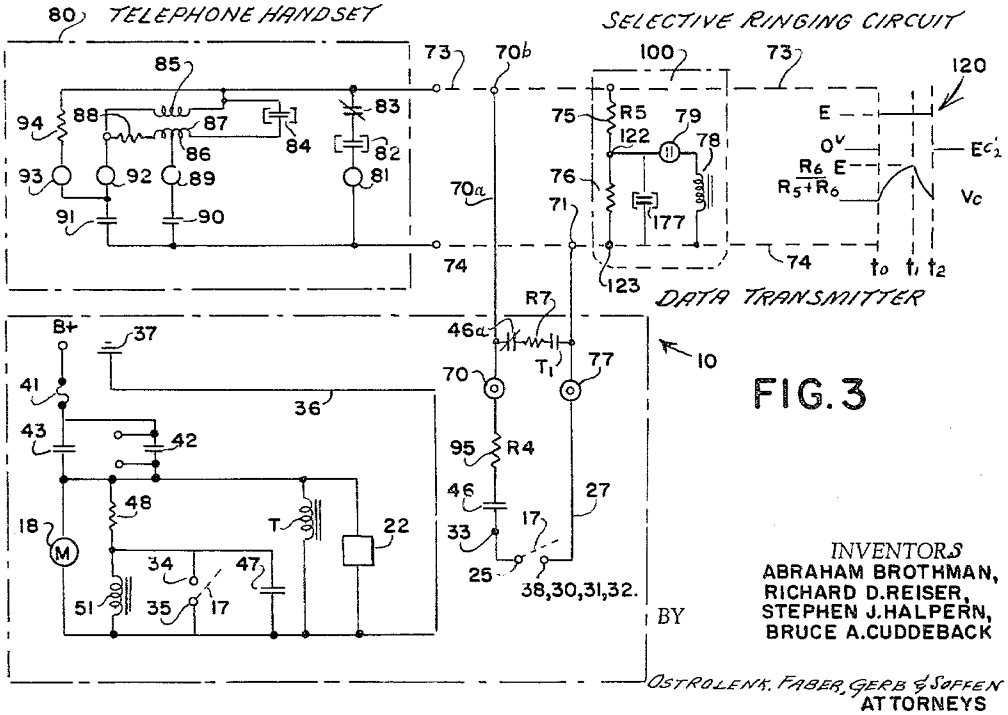
FIGURE 3 is a schematic diagram showing the manner in which the data transmitter of FIGURES 1 and 2 is electrically connected to the telephone system network.

One method of utilizing data transmitter 10 is shown in FIGURE 3 wherein the data transmitter 10 is electrically connected to the incoming lines 73 and 74 of a telephone network which lines also lead to the telephone hand set which is shown schematically as numeral 80. It should be understood however that the data transmitter 10 is not limited in use to telephone networks alone but may be utilized in other communication networks, such as networks which employ electromagnetic wave propagation as the communication medium. Also, transmission may be arranged to take place through other wiring systems such as through utility company power lines or through telegraph lines.

Since it is already understood that data transmitter 10 operates on an intermittent time sharing basis with all other data transmitters, it is therefore neither necessary nor economical to have transmitter 10 in an energized state at all times. For this reason, we provide a selective ringing circuit 100 which is so arranged as to energize data transmitter 10 only upon the occurrence of a data transmission request signal from the central location (not shown) which request signal is incapable of ringing telephone hand set 80 so as to create a false impression of a normal telephone call.

Selective ringing circuit 100 is comprised of series resistors 75 and 76 which shunt incoming lines 73 and 74. A capacitor 177 has one of its terminals connected between resistors 75 and 76 while its other terminal is connected to line 74. A series circuit consisting of gaseous discharge lamp 79 and relay coil 78 is electrically connected in parallel with capacitor 177. The transmission request signal 120 which is a sudden change in D.C. voltage level impressed upon the subscriber line 73–74 at time $t_0$ causes capacitor 177 to begin charging. At time $t_1$ the voltage across capacitor 177 as shown by waveform 120*a* reaches $$\frac{R_6}{R_5+R_6}E$$

where $E$=the voltage impressed upon subscriber line 73–74. Discharge lamp 79 is selected to break down at the above voltage level causing relay coil 78 to be energized. Relay coil 78 when energized closes its normally open contacts 42 which are located in data transmitter 10 in order to energize data transmitter 10 as will be more fully described. It should be noted that the transmission request signal 120 must be of such voltage amplitude and duration as to be clearly distinguishable from any cyclically varying waveform or spurious waveform which lack the pulse duration and voltage amplitude to energize relay coil 78. Resistors 75 and 76 are of the order of one-half of a megohm so that their presence across subscriber line 73–74 does not load the line appreciably. Also during the conduction of solenoid 78 a half-megohm is present across the line.

Upon successful completion of the transmission of the encoded data from data transmitter 10 the output utilization device (not shown) it is no longer necessary to have data transmitter 10 remain in its energized state. The circuit arrangement for the de-energizing function as well as the energizing function can best be seen in FIGURES 2 and 3 wherein FIGURE 3 shows data transmitter 10 in purely schematic form and FIGURE 2 shows data transmitter 10 in partially schematic and partially physical form. The electrical circuitry includes a positive voltage supply B+ which is connected to a fuse means 41 arranged to protect the circuitry from overload or fault current conditions. Two normally open contact pairs 43 and 42 have their upper terminals connected to the lower terminal of fuse 41 at point 110 while the lower terminals of normally open contact pairs 42 and 43 are electrically connected at point 111. Motor 18 has one of its terminals connected to point 111 and its opposite terminal connected at point 112 which point is electrically connected' to ground potential 37 by lead 36. A thermal delay relay coil 22 is connected in parallel with motor 18. A third path in electrical parallel with the paths containing motor 18 and thermal delay coil 22 respectively consists of conductive member 49 on printed circuit plate 11 which is electrically connected to point 111 at one of its terminals and to resistor 48 at its other terminal. The opposite terminal of resistor 48 is electrically connected to conductive member 34 which is in turn connected to conductive member 53 both members 34 and 53 being positioned on switching circuit plate 11. The remaining terminal of conductive member 53 is connected to relay coil 51 which has its remaining terminal connected to ground 37 by means of lead 36. A normally open limit switch 113 is placed in electrical parallel with relay coil 51 for manual de-energization of data transmitter 10 as will be more fully described.

The parallel path which consists of conductive member 49, resistor 48, conductive member 34, leads 114, conductive member 53 and relay coil 51 to ground may be partially shunted so as to create a direct short circuit across relay coil 51 either upon the closing of normally open relay contacts 47 which are controlled by thermal delay 22 or relay coil 51 may be shunted by the conductive spheres 20*a* and 21*a* of rotary arm 17 which come into engagement with conductive members 34 and 35 as will be more fully described.

The energization of data transmitter 10 under control of selective ringing circuit 100 operates as follows:

A transmission request voltage signal 120 is impressed across the subscriber lines 73 and 74 at time $T_0$. As can be seen, voltage drops develop across resistors 75 and 76 in proportion to the magnitudes of the resistances. However, just prior to time $t_0$, the voltage across lines 73 and 74 was 0, which means that the voltage drop across resistors 75 and 76 was 0. Upon the occurrence of the voltage step from 0 volts to E volts the entire voltage drop is developed across resistor 75 since the voltage across resistor 76 cannot change instantaneously due to capacitor 177 which is in parallel with resistor 76. The voltage across terminals 122 and 123 rises exponentially until it approaches the value $$\frac{R_6}{R_5+R_6}E$$

which is the maximum voltage which can be developed across terminals 122 and 123. The rate of rise $t_1—t_0$ is determined by the magnitudes of resistor 76 and capacitor 177. The characteristics of gaseous discharge lamp 79 are such that it will not become conductive until a predetermined critical voltage is reached and upon the occurrence of this voltage will break down completely acting as a direct short circuit until the voltage across gaseous discharge lamp 79 is reduced to 0.

The critical ignition voltage of lamp 79 is chosen so that it is within the approximate region of the voltage drop developed between terminals 122 and 123 at time $t_1$. Thus, at time $t_1$ glow discharge lamp 79 starts to conduct causing a current to pass through relay coil 78. The current flowing through coil 78 is of sufficient magnitude to cause normally open contacts 42 to close.

Upon the closing of normally open contacts 42 four parallel conductive paths in data transmitter 10 become energized. These paths are:

(A) B+ to fuse 41 through contacts 42 to motor 18 and ground potential 37; (B) B+ to fuse 41 through contacts 42, thermal delay relay winding 22 and lead 36 to ground potential 37; (C) B+ to fuse 41 through contacts 42, lead 115, conductive segment 49, resistor 48, conductive segment 34, lead 114, conductive segment 53, lead 116, relay coil 41 and lead 36 to ground potential 37; (D) B+ through fuse 41 to contacts 43, timer relay coil T to ground potential 37. Since limit switch 113 is normally open relay coil 51 is not shunted at this time.

The impedance of the above three conductive paths are substantially equal in magnitude so that all three paths draw currents of magnitudes sufficient to drive the components in each path. The current drawn by conductive path C causes relay coil 51 to close normally open contacts 43 thus establishing a parallel path across relay contacts 42. At this instant, if contacts 42 were to become disengaged, relay 51 has already operated to close normally open contacts 43 so that data transmitter 10 is in the energized state. The significance of the timing here is such that the input voltage pulse 120 (see FIGURE 3) must have pulse width $t_2—t_0$ which is of sufficient duration so as to permit relay coil 78 to close normally open contacts 42 thus energizing relay coil 51 in order to close normally open contacts 43. This having been done pulse 120 is then stepped down to the 0 voltage level at time $t_2$.

Relay coil 51 further opens a normally closed pair of contacts 46*a* to prevent the existence of a shunt path between terminals 70*b* and 71*b* so that transmission from transmitter 10 to subscriber 73–74 may take place.

The relay T is a delay timer which upon energization closes normally open contacts $T_1$ which although closed, fails to establish a shunt path across terminals 70*b* and 71*b* due to the opening of normally closed contacts 46*a*.

The end of transmission signal is generated as follows:

When rotary arm 17 is in vertical alignment with conductive segments 34 and 35 (see FIGURE 2) a shunt path is created across relay coil 51 thereby de-energizing it. This causes contacts 46*a* to return to their normally closed condition. The delay action of time delay relay T keeps contacts $T_1$ closed a predetermined period after de-energization of relay coil 51 even though contacts 43 which are under the control of relay 51 return to their normally open state causing the de-energization relay coil T. The shunt path of contacts 46*a*, resistor R7 and contacts $T_1$ impresses a "long" pulse upon the subscriber line 73–74 which is thus recognized by the receiver facility as an end of transmission signal.

The pulse duration $t_2—t_0$ of voltage pulse 120 also has the limitation that it must not be of long enough duration so as permit selective ringing circuit 100 to oscillate. This occurs as follows:

When glow discharge lamp 79 starts to conduct, this effectively places a short circuit across parallel branches 76 and 177 causing the voltage between terminals 122 and 123 to drop substantially to zero. At this instant, glow discharge lamp 79 is cut off enabling capacitor 177 to begin charging. This cycle may become repetitive as long as the voltage level E is impressed between lines 73 and 74. Thus it can be seen that the time constants and the input voltage pulse 120 must be selected so as to be of sufficient duration to permit contacts 43 to lock in and to be short enough so as to prevent the oscillation described immediately above.

The energization of motor 18 initiates the rotation of rotary arm 17 in the clockwise direction as shown by arrow 122.

Relay coil 51 also closes a second pair of normally open contacts 46 thus placing lead 70*a*, which is electrically connected to line 73 at point 70*b*, into electrical contact with the first radially aligned conductive member 123. Since conductive member 123 is electrically connected to circular conductive member 29, this places each radially aligned member 28 and 30 in electrical contact with circular conductive member 29. A second lead 71*a* establishes electrical connection between line 74 at point 71*b* and with contact 26 of circular conductive member 25.

As rotary arm 17 travels through its clockwise rotational movement intermittent electrical contact is made across leads 70 and 71 by means of the conductive spheres 19*a* through 21*a* of rotary arm 17 and the radially aligned conductive members 28, 30 and 31 respectively in a manner to be more fully described.

Rotation of rotary arm 17 is initiated from the starting position of rotary arm 17 which is shown in FIGURE 2, clockwise through a 360° sweep back to the position shown in FIGURE 2. Immediately prior to rotary arm 17 returning to the starting position shown in FIGURE 2, conductive spheres 20*a* and 21*a* come into contact with conductive members 35 and 34 respectively. This establishes a conductive path from positive voltage source B+ to fuse 41 through relay contacts 43, conductive member 49, resistor 48, conductive member 34, conductive sphere 21*a*, rotary arm 17, conductive member 20*a*, conductive segment 35 and lead 36 to ground potential 37. It can be seen that the conductive path established across conductive members 34 and 35 acts to shunt and thereby de-energize relay winding 51 causing relay contact pairs 43 and 46 respectively to return to their normally opened positions. Thus the transmitting circuit through leads 27 and 33 which are connected to lines 73 and 74 by leads 70 and 71 respectively are now open circuited preventing any further transmission from taking place.

Also, driving motor 18 becomes de-energized simultaneously therewith thereby removing the rotational driving force from rotary arm 17 so that rotary arm 17 remains in the starting position as shown in FIGURE 2.

If for any reason motor 18 falls into a state of disrepair, or if rotary arm 17 fails to operate properly, thermal delay relay coil 22 is designed so that its relay contacts 47 which are in the normally opened position are closed after a time duration which is equal in length to the time needed for rotary arm 17 to move through one cycle of its rotation. When this time period has elapsed thermal delay coil 22 causes normally open contacts 47 to become engaged thus establishing electrical contact between conductive member 34 and lead 36 to ground potential 37 bypassing relay coil 51 and subsequently de-energizing relay coil 51.

Normally open switch 113 which is placed in electrical parallel with relay coil 51 may be utilized for the purpose of inspecting and/or repairing data transmitter 10. By closing the contacts of normally opened switch 113 a by-pass circuit is created across relay coil 51 such that normally opened contacts 43 which are under the control of relay coil 51 are prevented from locking in data transmitter 10 to positive voltage supply B+.

The parallel to serial conversion of the data transmitter operates as follows:

As can be seen in FIGURE 2, the radially aligned conductive members 28 are electrically connected to circular conductive member 29. As rotary arm 17 makes its clockwise sweep, conductive sphere 20*a* comes into successive engagement with each radial member 28 in a tandem fashion. At the instant that conductive sphere 20*a* rests upoin a radial conductive member such as conductive member 28′, a circuit is completed from lead 71 to terminal 26, circular conductive member 25, conductive sphere 19*a*, finger 19 to finger 20 of rotary arm 17, sphere 20*a*, radial segment 28′, conductive member 29, radially aligned member 123, terminal 32 of member 123, lead 33 through relay contacts 46 to lead 70.

Leads 33 and 71 are connected across incoming lines 73 and 74 thereby connecting resistor 95 (see FIGURE 3) across lines 73 and 74. The value of resistor 95 is chosen so that its resistance is substantially less than the resistance of resistors 75 and 76, that is, the resistance magnitudes are wide enough apart so that the receiving equipment (not shown) at the central location is able to differentiate between the two shunt resistance conditions.

The resistance of resistor 95 is also chosen with the important fact in mind that its value should not be so low as to create a fault current or over-load current condition in subscriber lines 73 and 74.

In FIGURE 6, the condition of resistor 95 being shunted across subscriber lines 73 and 74 is represented by a positive pulse while the open-circuiting of the shunt circuit including resistor 95 is represented by the absence of a pulse as shown by wave form 161.

During one revolution sphere 20*a* makes electrical contact will every radial member 28 thus creating the wave form 161 shown in FIGURE 6, wherein each pulse 163 represents the condition of electrical contact between sphere 20*a* and each radial member 28. These pulses 163 are utilized to synchronize the transmitter with the receiving equipment as will be more fully described.

Radially aligned members 30 and 31 which are positioned outside circular conductive member 29 are utilized to receive the encoded binary data as will be more fully described. Radial members 30 are all in electrical contact with circular member 29 while members 31 are electrically insulated therefrom. Each member 31 has a terminal 32 which is of the type normally found in printed circuit boards. These terminals each receive a single binary digit which digits make up the binary coded representations being transmitted.

The code employed in FIGURE 6 is a "2 out of 5" code which is employed because of its inherent self-checking feature. This code is set forth in greater detail in the aforementioned U.S. application No. 125,247 entitled "Code Stack," now Patent No. 3,165,733. The encoders set forth in the above mentioned application act to create a short circuit for binary "one" representation and an open circuit for binary "0" representation. The encoder is shown schematically in FIGURE 2 by numeral 140. Thus assuming that sphere 21*a* rests upon a radial member such as radial member 31′ a circuit is completed from lead 71 to terminal 26 of circular member 25, conductive sphere 19*a* of rotary arm 17 to conductive sphere 21*a*, radial member 31′, lead 140′ at encoder 140, lead 38 through contacts 46 to lead 70.

The radially aligned members 30 and 31 are positioned between the radially aligned members 28 so that rotary arm 17 sweeps the radial members 28 and 30–31 in alternating fashion. Waveform 160 which represents the coded data combines with the synchronizing pulses of waveform 161 to form the composite waveform 162. The data pulses 164 are shown in dotted fashion. It can be seen that the absence of a data pulse between adjacent synchronizing pulses 163 represents a binary "zero" while the presence of a binary data pulse 164 between adjacent synchronizing pulses represents a binary "one."

Only a portion of the radial members are shown connected to the encoders 140–140*c* while specified ones of the remaining members 30–31 are connected by lead 141 to lead 33. This arrangement is employed in automatic meter reading systems wherein the data transmitter transmits a meter-identifying code followed by the meter reading. The connections of lead 141 shown in FIGURE 2 are encoded to represent the decimal number 3468 which is the meter identification number 165. In addition to the meter identification number 165, waveform 160 is also comprised of the binary coded representation of the meter reading 166 (which is the decimal number 5971), both representations 165 and 166 being in "2 out of 5" code as is more completely described in above mentioned U.S. application No. 125,247, now Patent No. 3,165,733. It should be understood that the manner in which data transmitter 10 is arranged in FIGURE 2 for encoding is merely exemplary since the radial members 30–31 may be connected to any type of parallel sources which are encoded in any binary fashion.

Since each binary coded decimal digit begins with a start (S) pulse, the radial members 30 are electrically connected to circular conductive member 29.

The manner in which the transmitter and receiver are synchronized (which is set forth in detail in U.S. application 71,093) is briefly as follows:

The receiver (FIGURE 7) employs a separating means 170 which receives waveform 162 and divides it up into waveform 160 and 161 at the output leads. The waveform 160 is impressed upon shift register one binary bit at a time and shifted across shift register 171 by synchronizing pulses 163 of waveform 161. The shift register 171 has a capacity of one binary coded decimal digit which is read-out from the register 171 when the shift register is completely loaded with one decimal digit. The synchronizing pulses thus completely avoid the need for other synchronizing methods at both the remote and the central locations. Also, the motor 18 need not drive rotary arm 17 at a constant r.p.m. allowing greater latitude in the selection of a motor for performing this function.

FIGURES 8 and 9 set forth a modification of the novel transmitter 10 which is arranged so as to accommodate shaft angle encoders 180 of the type set forth in U.S. application No. 125,247, now Patent No. 3,165,733, referred to above. The encoders are shown in only schematic form in FIGURE 8*b* wherein the contacts 181 are operated open or closed to represent binary "0" or binary "1" respectively under control of the rotatable shafts (not shown) to which they are mounted. Each encoder 180 has a common lead 183 which is electrically connected to one side of the contact pairs 181. The common leads 183 are connected to a separate arcuate conductor segment 184 through 187, respectively, on switching circuit board 11 of transmitter 10. The opposite ends of contact pairs 181 are connected through associated resistors 182 so that each resistor associated with the contact pair designated "0" of each encoder 180 through its associated resistor 182. Thus leads 190*a* through 190*f* are connected in parallel to the associated resistors of all encoders 180 shown in FIGURE 8*b*. Each parallel lead 190*a* through 190*f* is electrically connected to an associated radially aligned segment 200*a* through 200*f* respectively by means of the four groups of tap-off leads 191 through 194 respectively. Thus the "0" position contact pair of each encoder 180 is connected in parallel to each radially aligned segment 200*a*. An arcuate conductive segment 188 is provided which segment is electrically connected to resistance 96 in the output circuit of the transmitter by means of lead 189. Arcuate segment 188 is electrically connected to arcuate segments 184 through 187 in a sequential fashion by the conductive fingers 196 and 198 of wiper arm 17', the construction of wiper arm 17' being more clearly shown in FIGURE 9.

The conductive fingers 196 and 198 of wiper arm 17' each contain a conductive sphere 196 and 198 respectively which conductive spheres make contact with the conductive arcuate segments of tracks E and D respectively of the transmitter shown in FIGURE 8*a* in the same manner as the conductive spheres. Insulating members 197, 199 and 200 are provided to insulate conductive fingers 196 and 198 from the conductive body of wiper arm 17' while conductive member 201 is provided to both rigidly mount conductive fingers 196 and 198 and to establish electrical contact therebetween.

The operation of the shaft angle encoder sequential selecting circuit is as follows:

Transmitter 10 having been energized in the manner described previously causes wiper arm 17' to rotate in the clockwise direction. At the instant that the wiper arm contact fingers 196 and 198 come into engagement with the right hand most edges of arcuate segments 184 and 188 respectively, the circuit established through the transmitter extends from lead 71 to terminal 26 of conductive ring 25, contact finger 19, wiper arm 17' contact finger 21, radial segment **200*a*, lead 190*a*, to the "0" position of each shaft encoder 180. The conductive segments of tracks D and E select the "0" position of the appropriate shaft encoder by establishing a conductive path through the "0" position contact pair of the left-hand most shaft encoder 180, for example, through its associated common lead 183, to arcuate segment 184, to contact finger 198, conductive member 201, contact finger 196, conductive segment 188, lead 189, to resistance 196, thus establishing an electrical connection to the output leads 70 and 71**.

The operation is the same for each of the other conductive segments **200*b* through 200*f* which are sequentially swept by wiper arm 17' wherein the conductive arcuate segments 184 through 187 connect only one of the shaft encoders 180 into the transmitting circuit at a time. This arrangement permits the use of a minimum number of leads between the shaft angle encoders which are mounted in a utility meter and the transmitter 10 which may be mounted adjacent thereto, for example, the groups of leads 191 through 194 may all be wired as an integral part of transmitter 10 and likewise the parallel connection between like positions of the shaft encoders 180 may be wired within the utility meter enclosures requiring only 10 leads to be extended between the transmitter 10 and the shaft encoders 180, namely, the four common leads 183 and the 6 wire parallel group 190**.

As can be seen from both FIGURES 2 and 8, since a positive D.C. level is impressed on the leads 70 and 71 which are connected in parallel to the subscriber lines 73 and 74, this impresses the same positive across the radially aligned conductive segments such as conductive segments 28 and 31 or FIGURE 2 and the conductive spheres **20*a* and 21*a* which sequentially engage these segments. The same positive D.C. level is impressed across conductive segments 184 through 187 and conductive spheres 196*a* and 198*a* as well as the contacts in the shaft encoders 180. The continuous making and breaking of the positive D.C. circuit places a severe burden upon the conductive segments and conductive spheres resulting in a considerable lessening in the useful operating life of these members. Also, during the rotary movement of the wiper arms such as wiper arms 17 and 17'** of FIGURES 2 and 8*a* respectively, the conductive spheres may make a chattering engagement with the conductive segment it comes in contact with, thereby producing a chattering rather than a firm conductive path. These disadvantages are overcome by the two state circuit 205 which is shown in FIGURE 10.

FIGURE 10 shows the transmitter of FIGURE 8*a* in very brief schematic form wherein the four shaft encoders 180 described previously are shown connected to their associated arcuate segments 184 through 187 which are shown in FIGURE 10 as one contact of a contact pair wherein the opposite contact 188 is the schematic representation of the conductive segment 188 in track D of the transmitter shown in FIGURE 8*a*. The contacts 188 are all connected in parallel by leads 189 to lead 70 which connects the transmitter 10 to the positive volt D.C. side of the subscriber lines 73–74. The opposite terminals of encoders 180 are shown connected to parallel leads of group 190 which leads are sequentially swept by rotary arm 17 which has its opposite end connected to the lead 71 through segment 25 (see FIGURE 8*a*) which in turn is connected to the negative or B— side of subscriber lines 73–74 as shown in FIGURE 3.

The transmitter is modified by the presence of circuit 205 which connects terminals 189 from the shaft encoders 180 through a resistance 216 to lead 70. The intersection 217 of lines 189 is connected by leads 218 and 219 to the base of PNP transistor 212. A pair of resistors 210 and 211 are connected across lines 70 and 71 in series fashion. A resistor 213 is connected to the intersection 220 of resistors 210 and 211 and has its opposite end connected to the collector of transistor 212. The emitter of transistor 212 is connected to line 70 by resistance 215. Another resistor 214 is provided between the intersection 220 of resistances 210 and 211 and the base of transistor 212.

The operation of the transmitter in combination with the two state circuit 205 is as follows:

As rotary arm 17 sweeps across the individual leads 190 of the shaft angle encoders 180 the circuit will be open or closed depending upon the position of the contact pairs 181 which schematically represent the binary states of the six output leads of the encoder which is more fully described in U.S. application No. 125,247 entitled "Code Stack Assembly," now Patent No. 3,165,733, mentioned previously above. Assuming that rotary arm 17 engaged the segment connected to the terminal **190*a* and assuming that the contacts 184 and 188 are in engagement and that the contact pair 181 of the shaft encoder 180 in the upper left-hand corner of FIGURE 10 is in an engaged position, a circuit is completed from lead 71, rotary arm 17, parallel lead 190*a*, resistor R5 and its associated closed contact pair 181, contact 184, to contact 188, upper lead 189 and resistor 216 to lead 70. The presence of resistor 216 greatly diminishes the D.C. voltages impressed upon the conductive segments and conductive spheres of transmitter 10. The intersection 217 of leads 189 and resistor 216 is connected to the base of transistor 212 by leads 218 and 219 impressing ground potential upon the base of PNP transistor 212 causing it to conduct. Upon conduction, resistances 213 and 215 (assuming the resistance of transistor 212 to be negligible) are impressed in parallel across resistance 211 thus substantially dropping the resistance across leads 70 and 71 which connect the transmitter 10 to the subscriber lines 73–74** shown in FIGURE 3.

In the case where the contact pair 181 representing the binary bit being sensed is open circuited to represent a binary "0" the voltage at point 217 is approximately one half of the positive D.C. voltage is impressed upon the base of transistor 212 through terminals 218 and 219 thus inhibiting conduction. This creates effectively infinite resistance across series path consisting of resistors 213, 215 and transistor 212 causing the resistance between points 220 and 221 to be effectively equal to the value of resistance 221 which is approximately twice the ohmic value of resistance across points 220 and 221 when transistor 212 is in a state of conduction. This circuit thereby modulates the resistive value impressed across line 70 and 71 electronically thus subjecting conductive segments and conductive spheres of the transmitter 10 to D.C. voltages and currents which are substantially smaller than those which would be impressed upon the transmitter components in the absence of two-state circuit 205.

The two-state circuit 205 is modulated in the same manner as described above by means of the segments 30 and 31 (see FIGURE 2) which are utilized to transmit the transmitter identifying code and which are connected in the appropriate manner to lead 141 so as to generate the binary code which represents the decimal identifying number of the transmitter. These segments are shown schematically in FIGURE 10 and are swept by rotary arm 17 in the same manner as terminals 190*a*–190*e* set forth above.

As can be seen from FIGURES 2 and 8*a*–8*b*, one 360° sweep of rotary arms 17 or 18' is required to transmit the data from a bank of four shaft encoders such as shaft encoders 140 shown in FIGURE 2 or 180 shown in FIGURE 8. In many home installations which have gas, water and electric meters it is possible, by modifying the transmitter in the manner shown in FIGURES 11*a* and 11*b*, to transmit the binary coded data from each utility meter with only one transmitter by enabling the transmitter to make a plurality of full 360° sweeps wherein the number of complete revolutions will be limited only by the number of meters or other instruments to be read. This modifications is carried out by replacing the conductive segments 34 and 35 of the transmitters 10 shown in either FIGURE 2 or 8, by the conductive segments 305, 305*a* and 306 through 310 as well as the circuitry associated with these segments. Only so much of the transmitter 10 has been reproduced in FIGURES 11*a* and 11*b* as is required to understand the operation of the circuit in FIGURES 11*a* and 11*b*.

The operation of the circuit of FIGURES 11*a* and 11*b* are as follows: Upon the energization of selective relay 78, (see FIGURE 2), the relay contacts 42 engage to bypass normally open contacts 43 thus establishing an energizing circuit for the transmitter as previously described. As can be seen from the previous descriptions, the transmitter may be de-energized by shunting relay 51, which shunt circuit extends from ground potential 37, through normally open contacts S304*b*, lead 312, to conductive segment 305, through rotary arms 17 (not shown), to conductive segment 305*a*, lead 311, to point 313 which establishes ground potential at point 313 thus shunting relay 51. However, this operation is prevented from occurring until normally open contacts S304*b* are moved to their engaged position which operation does not occur until rotary arm 17 of the transmitter has completed the desired number of revolutions as will be more fully described.

When the transmitter becomes energized by the closing of contacts 42 under control of selective relay 78 (see FIGURE 2), relay 51 becomes energized, closing normally open contacts 43 as previously described, locking the transmitter 10 into the energized state. Having been energized, the motor 18 (see FIGURE 2) drives rotary arm 17 through one complete revolution. Relay 51 further closes normally open contacts 46 establishing a circuit from B+ through relay S300, contacts 46, resistor 315 and normally closed contacts S301*c* through S304*c*, to ground potential 37. Relay S300, having been energized, causes normally open contacts 300*b* to close. As rotary arm 17 traverses conductive segments 310 and 306 at the end of its first 360° sweep, a circuit is established from ground potential 37*a*, conductive segment 310, rotary arm 17 (not shown), conductive segment 306, and contacts S300*b* (which were moved to the engaged position by relay S300) through relay S301 to B+. The energization of relay S301 causes contacts S301*a* to be closed, contacts S301*b* to be closed and contacts S301*c* to be open. The opening of contacts S301*c* de-energizes relay S–300. The closing of contacts S301*a* establishes a current path from B+ through relay S301, resistor 316, contacts S301*a* and normally closed contacts S302*c* through S304*c* to ground potential 37, thus locking in relay S301 even after wiper arm 17 moves off of segment 306. The closing of contacts S301*b* "readies" relay S302 for energization. All subsequent relays S302 through S304 operate in the same manner as relay S301.

When relay S304 has been energized in the same manner as the previous relays S301 through S303 were energized, it closes normally open contacts S304*a* and S304*b* and opens normally closed contacts S304*c*. The opening of contacts S304*c* insures the de-energization of all other relays S300–S303 in the circuit. The closing contacts S304*a* locks relays S304 into the energized state for one full revolution of the rotary arm 17. At the end of the revolution rotary arm 17 (not shown) creates a conductive path between conductive member 305 and 305*a* thus establishing a circuit from ground potential 37, through contacts S304*b*, lead 312, segment 305, rotary arm 17, segment 305*a*, lead 311 and terminal 313 thereby shunting relay 51 which causes the contacts pair 43 to return to its normally open state and contacts pair 46 to likewise return to its normally open state, thereby de-energizing the transmitter 10. It can thus be seen that we have provided a circuit for permitting 5 consecutive revolutions of the transmitter wiper arm before the transmitter is de-energized.

The relays S300 through S304 further operate to select the encoders in the meter being read in a sequential manner. This function is carried out by the circuit of FIGURE 11*b*. In order to select the appropriate meter, two additional contact pairs are provided for each relay S300 through S304 so that the encoders of the meter to be read are connected to a positive D.C. voltage source while the encoders of the remaining meters are connected to ground potential. The operation is as follows: During the first revolution of rotary arm 17 (see FIGURE 2) relay S300 is energized causing contacts S300*d* to close and S300*e* to open. This places a positive D.C. voltage on the encoders of meter M1 through lead 325, closed contact pair S300*d* through lead 320. Since the other relays S301 through S304 are de-energized through the first revolution, normally closed contacts S301*e* through S304*e* remain closed and normally open contacts S301*d* through S304*d* remain open causing the encoders of meters M2 through M5 to remain connected to ground potential 37 through lead 327 and lead 326. Although the circuits of FIGURES 11*a* and 11*b* are employed to enable the transmitter to make five complete revolutions in order to sequentially read the instruments M1 through M5 without the necessity for additional transmitters, it should be understood that the circuit of FIGURES 11*a*–11*b* may be modified to read a greater or lesser number of meters.

Although we have described preferred embodiments of our invention, many variations and modifications will now be obvious to those skilled in the art and we prefer not to be limited to the specific disclosure herein but only by the appended claims.

We claim:

1. For use in a communications system existing subscriber telephone network means comprising a normally deenergized transmitter including first means for simultaneously receiving a predetermined plurality of groups of binary coded signals, second means making wiping contact with said first means for transmitting said binary signals in serial fashion, third means interspersed with said first means being intermittently slidably engageable with said second means for producing a synchronizing signal waveform interspersed with said binary signals for effecting synchronism of the system with said transmitter, fourth means responsive to a transmission request signal from a remote location for energizing said transmitter, said fourth means including means to respond to a predetermined transmission request signal which is incapable of initiating normal telephone operation between subscribers of the system, said fourth means including further means for momentarily energizing said transmitter, holding means energized by said momentary energization for retaining said transmitter in the energized state, said holding means including timing means for deenergizing said transmitter upon completion of the data transmission operation, said second means comprising a rotatable arm for sequentially wipingly engaging said first means, said first means being incapable of receiving all of said pluralities of groups of binary coded signals, fifth means for connecting a portion of said groups to said first means in sequential fashion, said second means being adapted to transmit said portion in one complete rotation of said rotary arm, said fifth means including sixth means which operates upon the termination of each complete rotation of said rotary arm for sequentially connecting remaining portions of said plurality of code groups to said first means, one at a time, and seventh means for deenergizing said transmitter a predetermined time after the connection of said last portion of said code groups to said first means.

2. A normally deenergized transmitter operative only upon receipt of a transmission request from a remote signal source comprising a plurality of conductive segments arranged in a first circular array, a rotatable arm having a first, second and third sensing member, said first member being positioned to sequentially engage said conductive segments of said first array, a motor for rotating said rotary arm, a source of energy; means for momentarily connecting said motor to said source upon the occurrence of a transmission request signal from a remote location, holding means energized by said momentary energization of said transmitter for retaining said transmitter in the energized state, a second array of conductive segments, said second member positioned for wiping engagement with said second array, a first circular conductive segment positioned for wiping engagement with said third sensing member, each of said segments of said second array being electrically connected to one another, each segment of said first array including means for receiving binary coded signals, said first, second and third sensing members being electrically connected to one another, said transmitter including means for electrically connecting each segment of said first array to said circular segment for modulating a communication medium in serial fashion with said binary coded signals.

3. A normally deenergized transmitter comprising a plurality of conductive segments arranged in a first circular array, a rotatable arm having a first, second and third sensing member, said first member being positioned to wipingly engage said conductive segments of said first array, a motor for rotating said rotary arm, a source of energy; means for momentarily connecting said motor to said source upon the occurence of a transmission request signal from a remote location, holding means energized by the momentary energization of said transmitter for retaining said transmitter in the energized state, a second array of conductive segments, said second member being positioned to make wiping engagement with said second array, a circular conductive segment positioned for wiping engagement with said third sensing member, each of said segments of said second array being electrically connected to one another, each segment of said first array including means to receive binary coded signals, said first, second and third sensing members being electrically connected to one another, said transmitter including means to electrically sequentially connect each segment of said first array to said circular segment for modulating a communication medium in serial fashion with said binary coded signals, each of said segments of said second array being wipingly engageable with said second member upon disengagement of said second array of segments from said first sensing member to produce a synchronizing waveform, said transmitter including means to generate a composite waveform comprised of a synchronizing waveform having a plurality of synchronizing signals interspersed with said binary coded signals.

4. A normally deenergized transmitter comprising a plurality of conductive segments arranged in a first circular array, a rotatable arm having a first, second and third sensing member, said first member being positioned to sequentially wipingly engage said conductive segments of said first array, a motor for rotating said rotary arm, a source of energy; means for momentarily connecting said motor to said source upon the occurrence of a transmission request signal from a remote location, holding means energized by the momentary energization of said transmitter for retaining said transmitter in the energized state, a second array of conductive segments, said second member being positioned to make wiping engagement with said second array, a circular conductive segment positioned for wiping engagement with said third sensing member, each of said segments of said second array being electrically connected to one another, each segment of said first array including means to receive binary coded signals, said first, second and third sensing members being electrically connected to one another, said transmitter including means to electrically connected each segment of said first array circular segment for modulating a communication medium in serial fashion with said binary coded signals, each of said segments of said second array making wiping engagement with said second member upon disengagement of said second array of segments from said first sensing member to produce a synchronizing waveform, said transmitter including means to generate a composite waveform comprised of a synchronizing waveform having a plurality of synchronizing signals interspersed with said binary coded signals, a deenergizing circuit comprising first and second members connected to across said holding means and positioned in the paths of said first and second sensing members, respectively, said deenergizing circuit including means to de-activate said holding means when said first and second conductive members are engaged by said first and second sensing members, respectively, said transmitter being deenergized upon de-activation of said holding means.

5. For use in a telephone system, a normally deenergized transmitter in parallel connection with a telephone handset which is normally energized by a cyclically varying waveform, said transmitter comprising a first group of terminals for simultaneously receiving a predetermined plurality of groups of binary signals, a rotatable conductive member making wiping contact with said first terminals for transmitting the signals at said terminals in serial fashion, a second group of terminals interspersed with the terminals of said first group and being alternately wipingly engaged by said movable conductive member for producing a synchronizing signal waveform interspersed with said binary signals for effecting synchronism of the system with said transmitter, an output terminal wipingly engaged by said rotatable conductive member for coupling the serial data into the telephone system.

6. The transmitter of claim 5 further comprising fourth circuit means responsive to a transmit request signal for energizing said transmitter, said transmission request signal being a voltage square pulse for energizing only said transmitter to the exclusion of the telephone handset.

7. The transmitter of claim 6 wherein said fourth circuit means is comprised of a local energy source, selective ringing means for connecting said transmitter to said energy source in response to a transmission request signal, said selective ringing means including means for connecting said transmitter to said energy source momentarily, holding means energized by the momentary energization of said transmitter for retaining said transmitter in the energized state.

8. The transmitter of claim 7 wherein said holding means includes timing means for releasing said holding means to deenergize said transmitter after a predetermined time period.

9. For use in a telephone communications system, a normally deenergized transmitter in parallel connection with a telephone handset normally energized cyclically varying waveform, said transmitter being adapted to transmit encoded data to a remote source and being comprised of first means for converting analog data into digital form, a first plurality of terminals for receiving said binary data, a rotatable arm making wiping engagement with said first terminals for transmitting said binary data in serial fashion, a second plurality of terminals interspersed with said first terminals in a regular alternating fashion and being intermittently wipingly engaged by said rotatable arm for producing a synchronizing signal waveform interspersed with said binary signals for affecting synchronism of the system with said transmitter, means for maintaining all of said second terminals at the same voltage level; said first means comprising a plurality of analog to digital converters, each having an output comprising a plurality of binary bit positions, second conductor means connecting associated bit positions of each of said converters in parallel, said second means comprising a third plurality of terminals slidably engageable with said rotatable arm means for sequentially energizing said converters, each of said converter binary outputs being serially impressed upon said second conductor upon sequential energization of said converters.

10. The transmitter of claim 9 further comprising two-state modulating means coupled to said rotatable arm for electronically controlling the output impedance of said transmitter rtsponsive to the binary state of the first and second groups of terminals sequentially coupled to said two-state modulating means by said rotatable arm.

11. The transmitter of claim 10 wherein said two-state modulating means is comprised of transistor means having output electrodes connected in parallel with its associated telephone handset and having an input electrode for receiving the composite resultant transmitter output, said transistor means being controlled to modulate the impedance of said subscriber line.

12. The transmitter of claim 5 further comprising a third terminal wipingly engaged by said rotatable arm for generating a long pulse at the end of the transmission operation.

References Cited by the Examiner

UNITED STATES PATENTS

| | | | |
|---|---|---|---|
| 2,225,648 | 12/1940 | Locke | 179—4 |
| 2,442,301 | 5/1948 | Locke | 178—53.1 |
| 2,921,978 | 1/1960 | Dingley | 178—53.1 |
| 2,959,639 | 11/1960 | Pierce | 179—15.55 |
| 3,047,662 | 7/1962 | Smith | 179—2 |

DAVID G. REDINBAUGH, *Primary Examiner.*

STEPHEN W. CAPELLI, *Examiner.*